July 23, 1929.　　A. T. HOLMAN ET AL　　1,722,090
ROCK DRILL AND LIKE RECIPROCATING TOOL AND VALVE MECHANISM THEREFOR
Filed July 13, 1926　　3 Sheets-Sheet 1
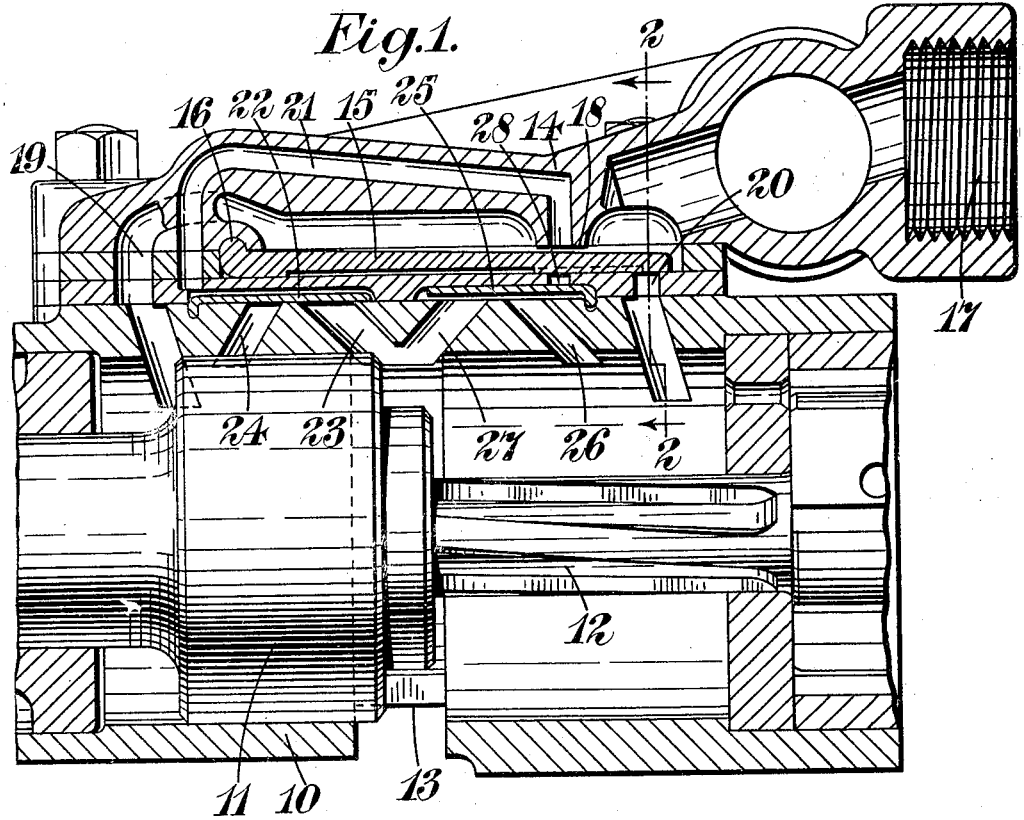
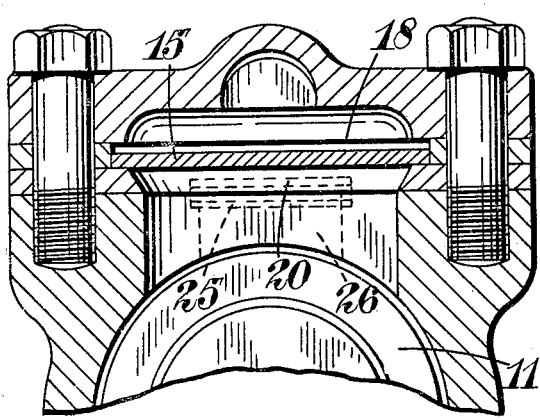
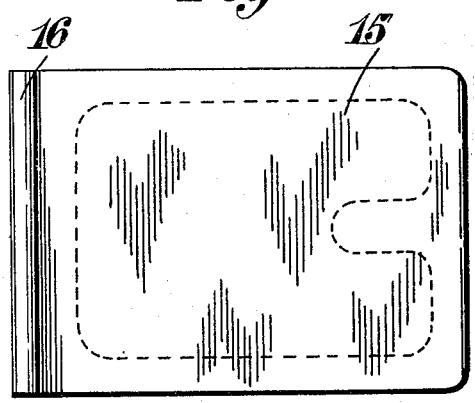
INVENTORS:
Arthur Truss Holman
Percy Mynors Holman
by
Byrnes, Stebbins & Parmelee
their Attorneys

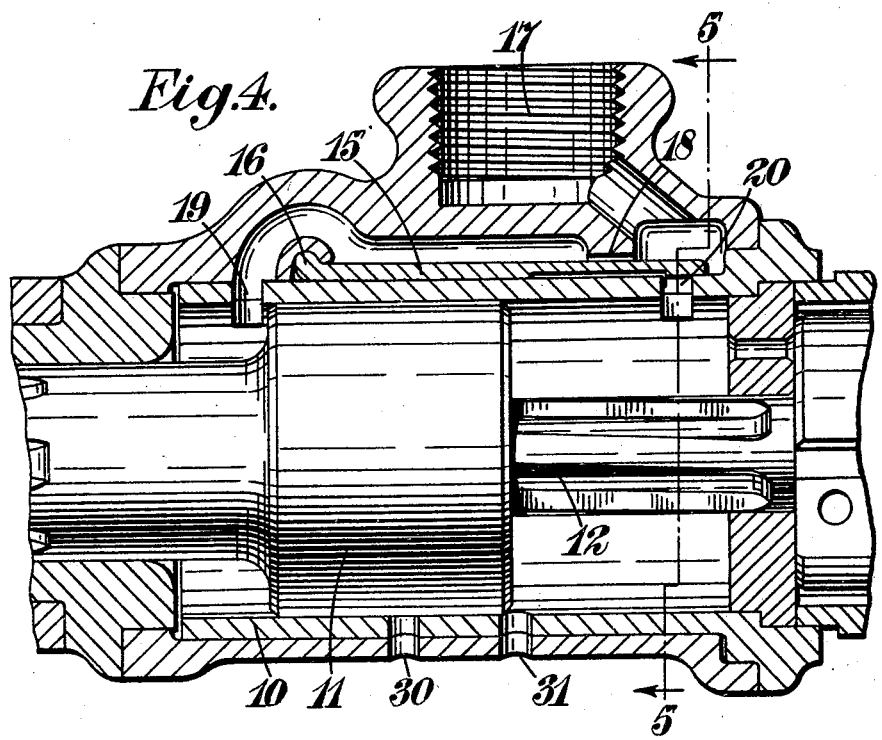
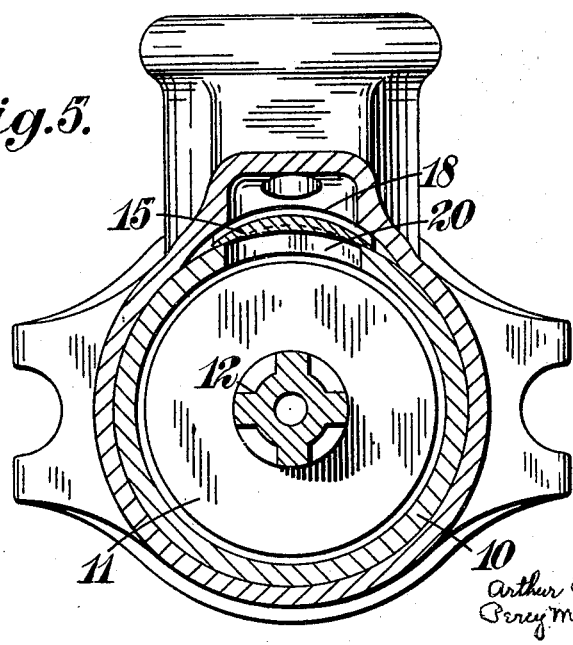

Patented July 23, 1929.

1,722,090

UNITED STATES PATENT OFFICE.

ARTHUR TREVE HOLMAN AND PERCY MYNORS HOLMAN, OF CAMBORNE, ENGLAND, ASSIGNORS TO HOLMAN BROTHERS LIMITED, OF CAMBORNE, CORNWALL, ENGLAND.

ROCK DRILL AND LIKE RECIPROCATING TOOL AND VALVE MECHANISM THEREFOR.

Application filed July 13, 1926, Serial No. 122,179, and in Great Britain March 6, 1926.

This invention consists in improvements in or relating to rock drills and like fluid actuated reciprocating tools and to valve mechanism therefor. The invention relates particularly to the kind of tool in which there is a cylinder, a reciprocating piston therein, inlet passages for the driving fluid leading to opposite ends of the cylinder and a single valve controlling the admission of driving fluid to both passages.

The type of valve to which the present invention relates (and which is referred to in the appended claims as "the type specified") is a flap valve which is hinged at or near one end and operates by its movement about its hinge to control by its opposite faces respectively two inlet passages leading to the opposite ends of the working cylinder.

According to the present invention a flap valve of the type specified is combined with a valve chamber which has one of its valve-controlled ports consisting of a direct short passage at one end of the cylinder, and which has a bridge situated between the two ends of the chamber so as to afford a second valve-controlled port (communicating with the inlet port for the other end of the cylinder) between adjacent surfaces of the bridge and the valve, the length of that part of the bridge with which the valve co-operates being such that only a small valve movement is necessary to open or close a relatively large port area which, when open, will permit a substantially unrestricted flow of driving fluid through it. Conveniently, the two valve-controlled conduits are disposed at or in the region of the free end of the valve so that the movement of the valve between its beats is small.

Preferably, the valve is a plate valve and in one form it is arcuate in a direction transverse to the length of the valve considered from its hinged to its free end.

In one example of the invention the inlet-passage near that end of the cylinder which does not communicate with the port of which the bridge forms one wall, opens in a port situated on that side of the valve which is remote from the bridge, and it is preferred that both the above-mentioned ports are situated close to the main air-inlet in the valve-chamber and near or at one end of the latter.

In order that the invention may be more clearly understood some preferred forms of the invention will now be described by way of example only with the aid of the accompanying drawings, in which:—

Figure 1 is a sectional elevation through a cylinder and valve of a rock drill, the section being taken in a plane containing the axis of the cylinder;

Figure 2 is a section on the line 2—2 of Figure 1;

Figure 3 is a plan of the valve alone looking from above in Figure 1;

Figure 4 is a view similar to Figure 1 of a modified construction according to the invention;

Figure 5 is a section on the line 5—5 of Figure 4;

Like reference numerals indicate like parts in all the figures of the drawings.

Figure 6:
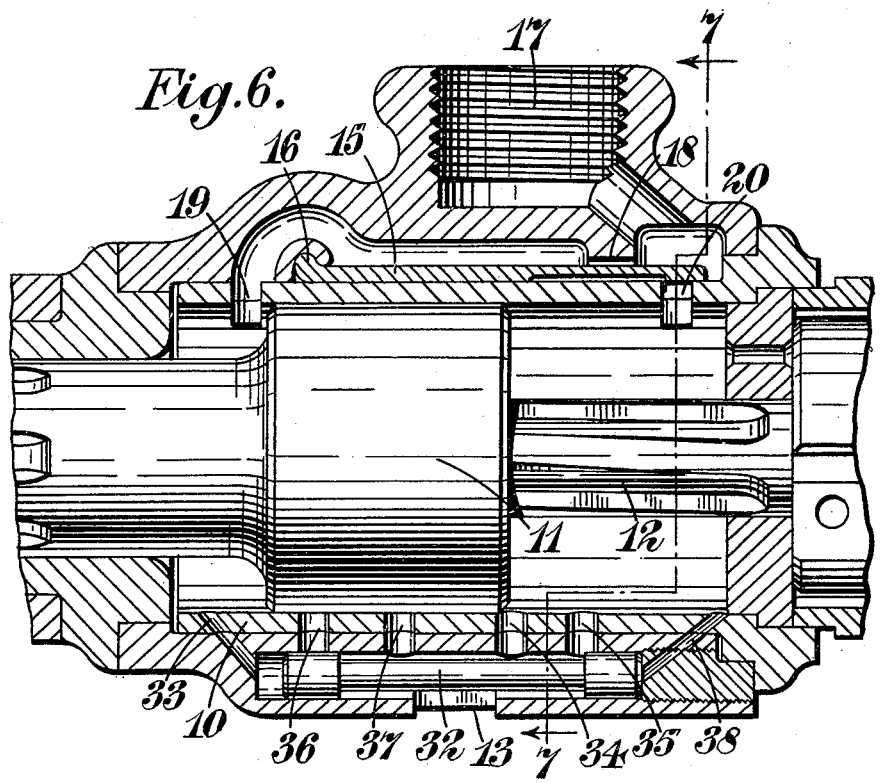
Figure 6 is a view also similar to Figure 1 of another modified form of the invention.

Referring first of all to Figures 1 and 2 it will be seen that only so much of a rock drill as is necessary to the understanding of the invention has been illustrated. As is usual there is provided a main cylinder 10 in which is a hammer-piston 11 associated in known manner with a twist-bar 12 and the usual ratchet twist mechanism. In the wall of the cylinder is a free exhaust port 13, the opening and closing of which is controlled by movement of the piston 11.

Within a valve-chamber 14 there is a main air-inlet control valve 15 which is longer than the stroke of the piston and which is in the form of a plate-valve hinged at one end, 16, by means of a transverse rib which is received within a correspondingly shaped groove in a transverse inner portion of the valve-chamber. Compressed air enters the chamber 14 through a main inlet 17 opening into one end of the valve-chamber in the region of the free end of the valve 15. A transverse bridge 18 serves as one beat for the valve 15 and air is enabled to pass between the adjacent surfaces of the bridge and the valve to a main air-inlet passage 19 when the valve is in the lower position illustrated. The passage 19 leads to the left-hand end of the cylinder 10, and another inlet passage 20 for the right-hand end of the cylinder is controlled by the lower face of the valve 15. The space between the adjacent surfaces of the bridge and valve constitute virtually a port which is controlled by movement of the valve.

In the wall of the valve-casing there is provided another passage 21 communicating between the face of the bridge and a pocket or chamber in which a pressure-release valve 22 is situated. This valve controls ports 23 and 24 leading respectively to the exhaust port 13 and to the cylinder near the left-hand end. A second pressure-release valve 25 controls ports 26 and 27, of which the port 26 opens into the other end of the cylinder and the port 27 communicates with the exhaust-port 13. The upper surface of the valve 25 controls a port 28 opening beneath the main valve 15.

In operation, compressed air enters the inlet 17 and passes over the valve (in the position illustrated) to the left-hand end of the cylinder through the passage 19. Air is also admitted through the passage 21 to the upper surface of the valve 22 and retains it in its closed position.

As the piston travels to the right the back pressure which would otherwise be produced in the right-hand end of the cylinder is released through the ports 26 and 27 and the exhaust-port 13 until the port 26 is closed. When the piston covers the port 26 it simultaneously, or practically simultaneously, opens the exhaust-port 13, thereby reducing the pressure on the top of the valve 15 by the sudden rush of air through the free release-port 13. Further travel of the piston to the right compresses air through the port 20 beneath the valve 15 and lifts the latter, whereby admission of air to the passages 19 and 21 is cut off and air is admitted through the port 20 to the right-hand face of the piston and also through the port 28 to the upper surface of the valve 25. The latter closes down over the ports 26 and 27 and the piston commences to move to the left, whereupon pressure from the left-hand end of the cylinder is released through ports 23 and 24 until the port 24 is closed and the port 13 opened. The pressure is then suddenly released from the right-hand end of the cylinder and compression taking place through the passage 19 reseats the valve 15 in its lower position and the cycle of operations is repeated.

In Figures 4 and 5 the valve 15 is similar to that shown in Figure 1 but the construction is modified by the omission of release-valves 22 and 25 and the ports controlled by them. As before, a bridge 18 is provided controlling the passage 19 leading to the left-hand end of the cylinder and in place of a single free release port 13 two release ports 30 and 31 are provided.

The form of the main valve chamber is slightly modified and the main air-inlet 17 is at the top instead of at the side.

In operation the compressed air enters the main inlet 17 and, in the position of the valve illustrated, passes over the valve 15 through the passage 19 to the left-hand end of the cylinder. The piston is forced rearwardly until it opens the exhaust-port 30, whereupon the pressure is immediately reduced in the left-hand end of the cylinder and above the valve. The compression produced in the right-hand end of the cylinder acts on the under surface of the valve 15 through the port 20 and raises it thereby closing the passage 19 by engagement of the upper surface of the valve 15 with the bridge 18. The compressed air then flows through the port 20 to to the right-hand face of the piston and the cycle of operations is reversed and subsequently repeated. On the travel of the piston towards the left the air from the right-hand end of the cylinder is released through the port 31 instead of through the port 30.

It will be seen that the cylinder 10 is constituted by a liner housed in a cylindrical continuation of the valve-chamber and is inserted thereinto from the right-hand end.

Figure 7:
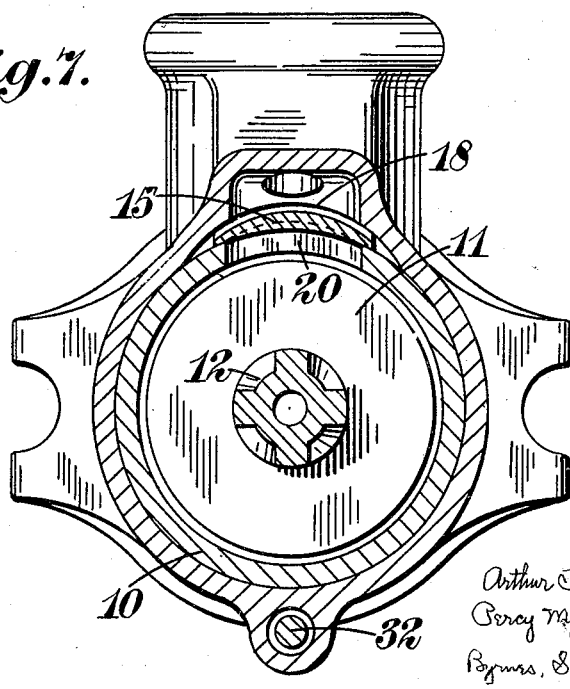
Figure 7 is a section on the line 7—7 of Figure 6.

In the construction illustrated in Figures 6 and 7 the arrangement of the valve-chamber and the ports controlled by it is similar to that illustrated in Figures 4 and 5, the principal difference being that in place of the free exhaust ports 30 and 31 a piston type of pressure-release valve 32 is provided at the lower end of the cylindrical continuation of the valve-chamber in which the liner 10 is carried. In Figure 6 air is shown as being admitted from the main inlet 17 through the passage 19 to the left-hand end of the cylinder and through a passage 33 to the left-hand end of the piston 32. The piston 11 is assumed to be travelling towards the right. Air is released through the ports 34 and 35 and main exhaust-port 13 until the port 35 is closed. At the same time the piston uncovers the port 36. Further travel of the piston to the right compresses air in the passage 38 and when the piston has travelled sufficiently far as to uncover the port 37, the pressure on the left-hand end of the piston is suddenly released through the exhaust-port 13 and the valve 32 is thrown over to the left by reason of the pressure exerted on the right-hand face of it through the passage 38. Simultaneously, pressure acting through the port 20 raises the valve 15 thus cutting off the supply of air to the passage 19 and admitting air through the ports 20 to the right-hand end of the cylinder. As the piston travels to the left the ports 36 and 37 act in a manner similar to that of the ports 33 and 34 above described, and the cycle of operations is reversed and the whole cycle subsequently repeated while driving fluid is supplied.

It will be seen that in the construction illustrated in Figures 4–7, the plate-valve instead of being flat in cross-section, as in the case of Figures 1—3, is curved transversely to the length of the valve considered from its hinged to its free end.

Three constructions have been described above in detail as examples of the invention, but it will be understood that the design of the parts may be modified without departing from the scope of the invention as defined by the appended claims.

We claim:—

1. In a fluid-actuated tool of the kind specified, the combination of a flap valve hinged at one end, a valve chamber having an inlet port therein and two outlet ports which are controlled by the valve and which communicate respectively with opposite ends of the cylinder, a direct short passage connecting one outlet port with one end of the cylinder, and a bridge situated between the two ends of the chamber to afford between it and an adjacent surface of the valve the second of said outlet ports and a passage which is constituted by the said face of the valve and the adjacent wall of the valve chamber and which is connected with the other end of the cylinder, the dimension of that part of the bridge with which the valve cooperates being such that only a small valve movement is necessary to open or close a relatively large port area which is sufficiently large as to permit a substantially unrestricted flow of driving fluid through it.

2. In a fluid-actuated tool of the kind specified, the combination of a flap valve hinged at one end, a valve chamber having an inlet port therein and two outlet ports which are controlled by the valve in the region of the free extremity thereof and which communicate respectively with opposite ends of the cylinder, a direct short passage connecting one outlet port with one end of the cylinder, a bridge situated between the two ends of the chamber to afford between it and an adjacent surface of the valve the second of said outlet ports and a passage which is constituted by the said face of the valve and the adjacent wall of the valve chamber and which is connected with the other end of the cylinder, the dimension of that part of the bridge with which the valve cooperates being such that only a small valve movement is necessary to open or close a relatively large port area which is sufficiently large as to permit a substantially unrestricted flow of driving fluid through it.

3. In a fluid-actuated tool of the kind specified, the combination of a flap valve that is hinged at one end and is in the form of a plate arcuate in a plane transverse to the length of the valve considered from its hinged to its free end, a valve chamber having an inlet port therein and two outlet ports which are controlled by the valve and which communicate respectively with opposite ends of the cylinder, a direct short passage connecting one outlet port with one end of the cylinder, and a bridge situated between the two ends of the chamber to afford between it and an adjacent surface of the valve the second of said outlet ports and a passage which is constituted by the said face of the valve and the adjacent wall of the valve chamber and which is connected with the other end of the cylinder, the dimension of that part of the bridge with which the valve cooperates being such that only a small valve movement is necessary to open or close a relatively large port area which is sufficiently large as to permit a substantially unrestricted flow of driving fluid through it.

4. In a fluid-actuated tool of the kind specified, the combination of a flap valve hinged at one end, a valve chamber having an inlet port therein and two outlet ports which are controlled by the valve, said outlet ports being both situated close to the inlet port and towards one end of the valve chamber and communicating respectively with opposite ends of the cylinder, a direct short passage connecting one outlet port with one end of the cylinder, a bridge situated between the two ends of the chamber to afford between it and an adjacent surface of the valve the second of said outlet ports and a passage which is constituted by the said face of the valve and the adjacent wall of the valve chamber and which is connected with the other end of the cylinder, the dimension of that part of the bridge with which the valve cooperates being such that only a small valve movement is necessary to open or close a relatively large port area which is sufficiently large as to permit a substantially unrestricted flow of driving fluid through it.

5. In a fluid-actuated tool of the kind specified, the combination of a flap valve hinged at one end, a valve chamber having an inlet port therein and two outlet ports which are controlled by the valve in the region of its free extremity, said outlet ports communicating respectively with opposite ends of the cylinder and both being situated close to the inlet port and towards that end of the valve chamber in which the free extremity of the valve is situated, a direct short passage connecting one outlet port with one end of the cylinder, a bridge situated between the two ends of the chamber to afford between it and an adjacent surface of the valve the second of said outlet ports and a passage which is constituted by the said face of the valve and the adjacent wall of the valve chamber and which is connected with the other end of the cylinder, the dimension of that part of the bridge with which the valve cooperates being such that only a small valve movement is necessary to open or close a relatively large port area which is sufficiently large as to permit a substantially unrestricted flow of driving fluid through it.

6. In a fluid-actuated tool of the kind specified, the combination of a flap valve hinged at one end and extending from its hinged end to its free end in the direction of the axis of the working cylinder and having a minimum length equal to that of the stroke of the piston, a valve chamber having an inlet port therein and two outlet ports which are controlled by the valve and which communicate respectively with opposite ends of the cylinder, a direct short passage connecting one outlet port with one end of the cylinder, a bridge situated between the two ends of the chamber to afford between it and an adjacent surface of the valve the second of said outlet ports and a passage which is constituted by the said face of the valve and the adjacent wall of the valve chamber and which is connected with the other end of the cylinder, the dimension of that part of the bridge with which the valve cooperates being such that only a small valve movement is necessary to open or close a relatively large port area which is sufficiently large as to permit a substantially unrestricted flow of driving fluid through it.

7. In a fluid-actuated tool of the kind specified, the combination of a flap valve hinged at one end, a valve chamber having an inlet port therein and two outlet ports which are controlled by the valve and communicate respectively with opposite ends of the main cylinder, a main cylinder and a liner therefor which also constitutes an inner wall for the valve chamber, a direct short passage connecting one outlet port with one end of the cylinder, and a bridge situated between the two ends of the chamber to afford between it and an adjacent surface of the valve the second of said outlet ports which is connected with the other end of the cylinder by a relatively long passage, the dimension of that part of the bridge with which the valve cooperates being such that only a small valve movement is necessary to open or close a relatively large port area which is sufficiently large as to permit a substantially unrestricted flow of driving fluid through it.

8. In a fluid-actuated tool of the kind specified, the combination of a flap valve hinged at one end, a valve chamber located substantially parallel to the axis of the main cylinder and having one inlet port and two outlet ports therein, which outlet ports communicate respectively with opposite ends of the main cylinder, a direct short passage connecting one outlet port with one end of the cylinder, a bridge formed across the interior face of the valve chamber near to one end thereof so as to afford between it and an adjacent surface of the valve the second of said outlet ports and a passage which is constituted by the said face of the valve and the adjacent wall of the valve chamber and which is connected to the other end of the cylinder, the length of that part of the bridge in a direction transverse to the length of the valve measured from its hinged to its free ends being such that only a small valve movement is necessary to open or close a relatively large port area, and a pivotal mounting for the valve located at that end of the valve chamber remote from the bridge so that angular movement of the valve about its pivot to control the outlet ports is of small extent.

9. In a fluid-actuated tool of the kind specified, the combination of a flap valve hinged at one end, a valve chamber located substantially parallel to the axis of the main cylinder, an inlet port leading into one end of the valve chamber through that face remote from the cylinder, an outlet port positioned substantially directly opposite the inlet port and communicating by a direct short passage with one end of the cylinder with the valve disposed between the inlet and outlet ports, a bridge formed across the interior of the valve chamber on that side of the valve on which the inlet port is situated so as to form between the bridge and the adjacent surface of the valve the second of the aforesaid outlet ports, a passage which is constituted by the said face of the valve and the adjacent wall of the valve chamber and which is connected with the opposite end of the main cylinder, the construction being such that the length of the bridge extends transversely to the length of the valve considered in a direction between its fixed and free extremities, and the length of the bridge which cooperates with the surface of the valve is such that a small movement of the valve will open or close a relatively large port area, the pivotal mounting for the valve being located at that end of the valve chamber remote from the bridge so that angular movement of the valve about its pivot to control said two outlet ports is of relatively small extent.

10. In a fluid-actuated tool of the kind specified, the combination of a valve chamber, a flap valve therein which extends lengthwise of the valve chamber in a direction parallel with the axis of the main cylinder and which at one end is hinged by engagement with a hooked flange extending from an inner wall of the valve chamber, an inlet port entering the valve chamber in the vicinity of the free end of the valve, an outlet port situated on that side of the valve remote from the inlet port and substantially directly opposite to the said inlet port so as to communicate by a direct short passage with one end of the main cylinder, a transversely-disposed bridge formed across the interior of the valve chamber and on that side of the valve at which the inlet port is situated so as to form between the bridge and the adjacent surface of the valve the second of said outlet ports, a passage constituted by the said face of the valve and the adjacent wall of the valve chamber leading from said second outlet port to an inlet port at the opposite end of the cylinder, which passage is long in relation to the passage connecting the first said outlet port with the main cylinder, the length of that part of the bridge which cooperates with the adjacent surface of the valve being such that a small valve movement will open or close a relatively large port area for the purpose described.

11. In a fluid-actuated tool of the kind specified, the combination of a flap valve hinged at one end, a valve chamber having an inlet port therein and two outlet ports which are controlled by the valve and which communicate respectively with opposite ends of the cylinder, a direct short passage connecting one outlet port with one end of the cylinder, and within the valve chamber a second outlet port constituted between a face of the valve and a valve seating adjacent that face and engaged therewith at one end of the stroke of the valve, and a relatively long passage constituted by a portion of the interior of the valve chamber extending between the said second outlet port to the opposite end of the cylinder, the dimension of the engaging surfaces of the valve and the seating aforesaid being such that only a small valve movement is necessary to open or close a relatively large port area for the purpose described.

12. In or for a fluid-actuated tool of the kind specified, the combination of a flap valve hinged at one end, a valve chamber having an inlet port therein and two outlet ports which are controlled by the valve and which communicate respectively with opposite ends of the cylinder, a direct short passage connecting one outlet port with one end of the cylinder, and a bridge which extends completely across the valve chamber transversely of the length of the valve considered from the hinge to the free end thereof so as to form between the bridge and an adjacent surface of the valve the second of said outlet ports which is connected with the other end of the cylinder by a relatively long passage, the dimension of that part of the bridge with which the valve cooperates being such that only a small valve movement is necessary to open or close a relatively large port area which is sufficiently large as to permit a substantially unrestricted flow of driving fluid through it.

13. In or for a fluid-actuated tool of the kind specified, the combination of a flap valve hinged at one end, a valve chamber having an inlet port therein and two outlet ports which are controlled by the valve in the region of the free extremity thereof and which communicate respectively with opposite ends of the cylinder, a direct short passage connecting one outlet port with one end of the cylinder, and a bridge which extends completely across the valve chamber transversely of the length of the valve considered from the hinge to the free end thereof so as to form between the bridge and an adjacent surface of the valve the second of said outlet ports, which is connected with the other end of the cylinder by a relatively long passage, the dimension of that part of the bridge with which the valve cooperates being such that only a small valve movement is necessary to open or close a relatively large port area which is sufficiently large as to permit a substantially unrestricted flow of driving fluid through it.

14. In or for a fluid-actuated tool of the kind specified, the combination of a flap valve that is hinged at one end and is in the form of a plate arcuate in a plane transverse to the length of the valve considered from its hinged to its free end, a valve chamber having an inlet port therein and two outlet ports which are controlled by the valve and which communicate respectively with opposite ends of the cylinder, a direct short passage connecting one outlet port with one end of the cylinder, and a bridge which extends completely across the valve chamber transversely of the length of the valve considered from the hinge to the free end thereof so as to form between the bridge and an adjacent surface of the valve the second of said outlet ports which is connected with the other end of the cylinder by a relatively long passage, the dimension of that part of the bridge with which the valve cooperates being such that only a small valve movement is necessary to open or close a relatively large port area which is sufficiently large as to permit a substantially unrestricted flow of driving fluid through it.

15. In or for a fluid-actuated tool of the kind specified, the combination of a fluid valve hinged at one end, a valve chamber having an inlet port therein and two outlet ports which are controlled by the valve, said outlet ports being both situated close to the inlet port and towards one end of the valve chamber and communicating respectively with opposite ends of the cylinder, a direct short passage connecting one outlet port with one end of the cylinder, and a bridge which extends completely across the valve chamber transversely of the length of the valve considered from the hinge to the free end thereof so as to form between the bridge and an adjacent surface of the valve the second of said outlet ports which is connected with the other end of the cylinder by a relatively long passage, the dimension of that part of the bridge with which the valve cooperates being such that only a small valve movement is necessary to open or close a relatively large port area which is sufficiently large as to permit substantially unrestricted flow of driving fluid through it.

16. In or for a fluid-actuated tool of the kind specified, the combination of a flap valve hinged at one end, a valve chamber having an inlet port therein and two outlet ports which are controlled by the valve in the region of its free extremity, said outlet ports communicating respectively with opposite ends of the cylinder and both being situated close to the inlet port and towards that end of the valve chamber in which the free extremity of the valve is situated, a direct short passage connecting one outlet port with one end of the cylinder, and a bridge which extends completely across the valve chamber transversely of the length of the valve considered from the hinge to the free end thereof so as to form between the bridge and an adjacent surface of the valve the second of said outlet ports which is connected with the other end of the cylinder by a relatively long passage, the dimension of that part of the bridge with which the valve cooperates being such that only a small valve movement is necessary to open or close a relatively large port area which is sufficiently large as to permit a substantially unrestricted flow of driving fluid through it.

17. In or for a fluid-actuated tool of the kind specified, the combination of a flap valve hinged at one end and extending from its hinged end to its free end in the direction of the axis of the working cylinder and having a minimum length equal to that of the stroke of the piston, a valve chamber having an inlet port therein and two outlet ports which are controlled by the valve and which communicate respectively with opposite ends of the cylinder, a direct short passage connecting one outlet port with one end of the cylinder, and a bridge which extends completely across the valve chamber transversely of the length of the valve considered from the hinge to the free end thereof so as to form between the bridge and an adjacent surface of the valve the second of said outlet ports which is connected with the other end of the cylinder by a relatively long passage, the dimension of that part of the bridge with which the valve cooperates being such that only a small valve movement is necessary to open or close a relatively large port area which is sufficiently large as to permit a substantially unrestricted flow of driving fluid through it.

18. In or for a fluid-actuated tool of the kind specified, the combination of a flap valve hinged at one end, a valve chamber located substantially parallel to the axis of the main cylinder and having one inlet port and two outlet ports therein, which outlet ports communicate respectively with opposite ends of the main cylinder, a direct short passage connecting one outlet port with one end of the cylinder, a bridge which extends completely across the valve chamber near one end thereof and transversely of the length of the valve considered from the hinge to the free end thereof so as to form between the bridge and an adjacent surface of the valve the second of said outlet ports which is connected to the other end of the cylinder by a relatively long passage, the length of that part of the bridge in a direction transverse to the length of the valve measured from its hinged to its free ends being such that only a small valve movement is necessary to open or close a relatively large port area, and a pivotal mounting for the valve located at that end of the valve chamber remote from the bridge so that angular movement of the valve about its pivot to control the outlet ports is of small extent.

19. In or for a fluid-actuated tool of the kind specified, the combination of a flap valve hinged at one end, a valve chamber located substantially parallel to the axis of the main cylinder, an inlet port leading into one end of the valve chamber through that face remote from the cylinder, an outlet port positioned substantially directly opposite the inlet port and communicating by a direct short passage with one end of the cylinder with the valve disposed between the inlet and outlet ports, a bridge which extends completely across the valve chamber on that side of the valve on which the inlet port is situated and transversely of the length of the valve considered from the hinge to the free end thereof, so as to form between the bridge and the adjacent surface of the valve the second of the aforesaid outlet ports, a relatively long passage extending between said second outlet port and the opposite end of the main cylinder, the construction being such that the length of the bridge extends transversely to the length of the valve considered in a direction between its fixed and free extremities, and the length of the bridge which cooperates with the surface of the valve is such that a small movement of the valve will open or close a relatively large port area, the pivotal mounting for the valve being located at that end of the valve chamber remote from the bridge so that angular movement of the valve about its pivot to control said two outlet ports is of relatively small extent.

20. In or for a fluid-actuated tool of the kind specified, the combination of a valve chamber, a flap valve therein which extends lengthwise of the valve chamber in a direction parallel with the axis of the main cylinder and which at one end is hinged by engagement with a hooked flange extending from an inner wall of the valve chamber, an inlet port entering the valve chamber in the vicinity of the free end of the valve, an outlet port situated on that side of the valve remote from the inlet port and substantially directly opposite to the said inlet port so as to communicate by a direct short passage with one end of the main cylinder, a bridge which extends completely across the valve chamber on that side of the valve on which the inlet port is situated and transversely of the length of the valve considered from the hinge to the free end thereof, so as to form between the bridge and the adjacent surface of the valve the second of said outlet ports, a passage comprising adjacent surfaces of the inner wall of the valve chamber and the valve leading from said second outlet port to an inlet port at the opposite end of the cylinder, which passage is long in relation to the passage connecting the first said outlet port with the main cylinder, the length of that part of the bridge which cooperates with the adjacent surface of the valve being such that a small valve movement will open or close a relatively large port area for the purpose described.

In testimony whereof we have signed our names to this specification.

ARTHUR TREVE HOLMAN.
PERCY MYNORS HOLMAN.